United States Patent
Markandey et al.

[11] Patent Number: 5,249,128
[45] Date of Patent: Sep. 28, 1993

[54] SYSTEM AND METHOD FOR DETERMINING THE DISTANCE TO AN EMERGY EMITTING OBJECT

[75] Inventors: Vishal Markandey; Bruce Flinchbaugh; Floyd H. Hollister, all of Dallas, Tex.

[73] Assignee: Texas Instruments Incorporated, Dallas, Tex.

[21] Appl. No.: 614,814

[22] Filed: Nov. 16, 1990

[51] Int. Cl.$^5$ .................... G01C 3/08; G08G 1/16
[52] U.S. Cl. ................ 364/426.04; 364/461; 364/561; 180/170; 340/903; 356/4
[58] Field of Search ............ 180/167-170; 340/903; 356/1, 4, 5, 9, 141, 152; 364/424.01, 426.04, 460, 461, 565, 458, 561

[56] References Cited

U.S. PATENT DOCUMENTS

| | | | |
|---|---|---|---|
| 3,783,271 | 1/1974 | Abott et al. | 356/152 X |
| 4,786,164 | 11/1988 | Kawata | 180/168 X |
| 4,931,937 | 6/1990 | Kakinami et al. | 364/424.01 |
| 4,948,246 | 8/1990 | Sigematsu | 364/426.04 X |
| 4,988,189 | 1/1991 | Kroupa et al. | 364/458 X |
| 5,014,200 | 5/1991 | Chundrlik et al. | 364/426.04 |
| 5,039,217 | 8/1991 | Maekawa et al. | 364/424.01 X |
| 5,053,979 | 10/1991 | Etoh | 364/565 |
| 5,166,681 | 11/1992 | Bottesch et al. | 340/903 X |

FOREIGN PATENT DOCUMENTS 63-129212 of 1988 Japan.

OTHER PUBLICATIONS

"Advanced Mathematics For Engineers," Wilfred Kaplan, Addison-Wesley Publishing, Dec. 1981, pp. 5-8 & 782-788.

"Traffic Spatial Measurements Using Video Image Processing," S. Beucher, et al., SPIE vol. 848, Intelligent Robots and Computer Vision, Dec. 1987.

*Primary Examiner*—Thomas G. Black
*Assistant Examiner*—Thomas S. Auchterlonie
*Attorney, Agent, or Firm*—Frank J. Kowalski; Leo N. Heiting; Richard L. Donaldson

[57] ABSTRACT

A method and system for range detection using a passive infrared sensing device (10) is disclosed. The method includes determining a region (35,38) on a moving object, such as an automobile (13, 36, 37), the region (35, 38) having a size characteristic of the object and emitting energy (14) characteristic of the object. The next step is to characterize the region by a plurality of feature points (31, 32, 33, 34) and sense the energy emitting from the feature points. The next step is to calculate the distance between the sensing device (10) and the moving object as a function of the feature points. The method has application in adaptive cruise control for automobiles (13, 36, 37). The method includes the use of perspective projection formulae to determine the distance between the sensing device (10) and the moving object 13, 36, 37). To smooth measurements to each other, one embodiment of the method includes the use of an Euler predictor to integrate measurements across measurement firmness.

34 Claims, 4 Drawing Sheets a) WITHOUT PREDICTOR b) WITH PREDICTOR a) WITHOUT PREDICTOR b) WITH PREDICTOR

SYSTEM AND METHOD FOR DETERMINING THE DISTANCE TO AN EMERGY EMITTING OBJECT

TECHNICAL FIELD OF THE INVENTION

The present invention relates generally to distance measurement, and more particularly to a method and system for vehicle range estimation from infrared imagery.

BACKGROUND OF THE INVENTION

In many modern automobiles, a driver may control speed manually by depressing and releasing the automobile's gas pedal or automatically by operating a speed or cruise control device that electronically maintains the automobile's speed. When using the known types of automatic cruise control features, a driver selects the speed at which to drive the car and sets the cruise control. Thereafter, unless the operator interrupts the cruise control device, the automobile will continue to travel at the set speed irrespective of proximity to other automobiles in its path. Thus, known cruise control devices cannot adjust an automobile's speed in response to the rapid approach to another automobile.

One attempt to address this problem is called adaptive cruise control (ACC). With ACC, the cruise control function of the automobile adapts to miscalculations on the part of the driver as evidenced by the rapid approach to another vehicle. An essential element in establishing ACC function is the ability to determine range and range-rate between the ACC-equipped automobile and other vehicles.

Passive ranging is one method of determining the range between a sensor and a moving object. A number of approaches have been suggested in computer vision literature to address the problem of passive ranging. These approaches can be broadly classified into motion analysis, stereo methods, and other approaches. Motion analysis can be further subdivided into optical flow approaches and structure and motion methods.

Optical flow uses the displacement field produced due to apparent motion of objects through an image sequence. Optical flow computation can be achieved by gradient-based or displacement-based methods. Gradient-based methods require the computation of spatio-temporal image intensity gradients which can be quite sensitive to noise. In fact, these techniques have often been criticized in literature as not being useful in real-life situations due to their noise sensitivity. Displacement-based methods tend to be more computationally expensive than the gradient-based methods as they require the extraction of features such as points, edges, or regions. These features are then matched across images to compute flow field estimates. Feature correspondence is a computationally expensive task. Without either improvement against noise sensitivity in gradient-based methods or a method to reduce the computational expense in displacement-based methods, optical flow methods have limited utility for motion analysis in adaptive cruise control.

Structure and motion methods, while being theoretically elegant, are sensitive to noise in practice and require large amounts of computation, converge slowly, and require many disparate views of the object. As a result, structure and motion methods have limited utility in passive ranging for adaptive cruise control applications. Likewise, stereo techniques, which rely on inputs from two or more sensing devices, have limited adaptive cruise control applicability because of the need for correspondence between images obtained from two cameras. The correspondence accuracy depends on knowledge from the relative camera positions, displacement between cameras, and the availability of prominent features on the target objects to match. Thus, stereo techniques do not offer acceptable passive ranging methods for adaptive cruise control.

There is the need for a method and system to determine target range and range rate for adaptive cruise control purposes.

There is also the need for a passive ranging method and system that satisfies requirements of automobile manufacturers for adaptive cruise control applications.

There is a further need for a passive ranging method and system that is relatively insensitive to noise, computationally inexpensive, and that does not require the use of multiple sensing devices for stereo signals from which to compute range.

The approach of S. Boucher, J. M. Blosseville, and F. Lenoir, "Traffic Spatial Measurements Using Video Image Processing (Application of Mathematical Morphology to Vehicles Detection)" SPIE Vol. 848 *Intelligent Robots and Computer Vision* 1987, ("Boucher") illustrates the use of an image processing system for traffic scene analysis. The system that Boucher describes performs the tasks of lane detection, vehicle detection, and vehicle tracking. While the Boucher system and method uses image processing for many applications, it is a sophisticated and expensive approach. The computational requirements and expense of the Boucher system, therefore, place it far outside the cost realm of the adaptive cruise control function for mass-produced automobiles.

Thus, there is a need for a passive ranging method and system that satisfies the cost limitations of automobile manufacturers. There is the need for a passive ranging method and system for use in adaptive cruise control that is both reliable and safe for use in consumer automobiles.

There is yet a need for a passive ranging system for use in adaptive cruise control systems that satisfies all of the above needs both efficiently and effectively.

SUMMARY OF THE INVENTION

The passive ranging method and system of the present invention satisfies the needs previously considered and overcomes the problems arising from existing passive ranging methods and systems. According to one aspect of the present invention, there is provided a method for passive ranging in adaptive cruise control that measures distance between a moving energy-sensing device, for example, a passive infrared sensor, and a moving energy-emitting object, for example, an automobile. The method comprises the steps of first determining a region on the object to be detected, which can be only a small portion of the overall moving object. The region of interest on the moving object has a size characteristic of the moving object and emits energy characteristic of the moving object. The next step is to characterize the region by a plurality of feature points. The feature points are points in the region that identify the bounds of the region. The method next calls for using the energy sensing device to sense the feature points. The distance between the energy sensing device and the moving object is calculated as a function of the feature points.

In the preferred embodiment of the present invention, the energy-sensing device is a passive infrared sensor and the moving energy-emitting object is an automobile moving on a road. Between these two objects, the passive ranging device of the present invention operates under the assumptions that straight lanes are on the road, the road is a flat plane, and limited aspects of the moving object are available for the passive ranging device to use in calculating distance from the sensing device. According to one aspect of the present invention, the region that characterizes the moving automobile is called an "extended hot spot." An extended hot spot is associated with a moving vehicle and occurs at the interface of the road and the vehicle. The extended hot spot occurs due to the combination of the hot exhaust gases reflecting off the ground and the infrared emissions from the wheels. With the limited aspects of the moving vehicle that the passive ranging device assumes, the extended hot spot is relatively uniform from one type of vehicle to another.

The passive ranging method and system of the present invention employs the "plane sweep" technique to identify a region on the moving-object upon which to perform computational geometry calculations using perspective projection formulae. Based on a version of the plane sweep technique, the method and system of the present invention detect the end points of the extended hot spot that are closest to the ground location. These points are called "feature points." The method of the present invention translates feature points detected by the plane sweep technique to compute the range between the vehicle being detected and the sensor to generate a value for distance.

According to yet another aspect of the present invention, the passive ranging method and system include an Euler predictor that predicts the feature point location that the method should generate based on the point location measured immediately prior to the present measurement. If the difference between the detected and predicted locations is beyond a certain threshold, the passive ranging method and system of the present invention replace the detected feature point by the predicted point location and use this value for range estimation.

One technical advantage of the present invention is that it provides a passive ranging method and system for use in adaptive cruise control.

Another technical advantage of the present invention is that it employs a passive ranging method and system that is insensitive to noise when compared to gradient-based optical flow methods and less computationally expensive than displacement-based optical flow methods for passive ranging. It is a further technical advantage that the passive ranging method and system of the present invention is computationally more rapid, less sensitive to noise, less expensive, and requires fewer object views than traditional structure and motion methods. Additionally, as opposed to stereo techniques for passive range calculations, the method and system of the present invention provide reasonably accurate distance measurements using only one energy sensing device.

Yet another technical advantage of the present invention is that it surpasses the objectives and capabilities of known image processing systems for traffic scene analysis and provides information immediately usable for adaptive cruise control applications.

A further technical advantage invention is that it provides passive ranging for adaptive cruise control that complies with the cost limitations of automobile manufacturers.

BRIEF DESCRIPTION OF THE DRAWINGS

For a more complete understanding of the present invention and for further advantages thereof, reference is now made to the following detailed description, taken in conjunction with the accompanying FIGUREs in which.

DETAILED DESCRIPTION OF THE INVENTION

The preferred embodiment of the present invention is best understood by referring to the FIGUREs, like numerals being used for like and corresponding parts of the various drawings.

Figure 1:
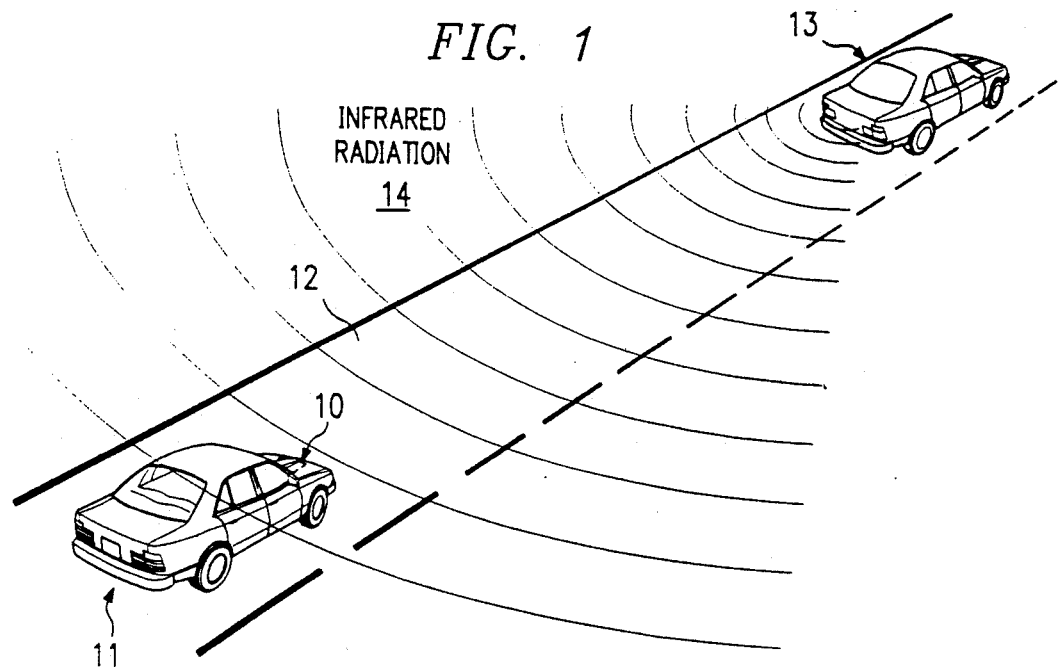
FIG. 1 is a conceptual drawing illustrating the use of the passive ranging techniques for vehicle range estimation in adaptive cruise control according to a preferred embodiment of the present invention.

FIG. 1 illustrates a scenario in which the passive ranging system 10 may be used as part of an adaptive cruise control function of automobile 11. Passive ranging system 10 may mount on automobile 11, for example, which travels on highway 12 behind automobile 13. As automobile 13 travels down highway 12, it emits infrared radiation 14 that travels down highway 12 and in the path of automobile 11. Passive ranging system 10 receives the infrared radiation and provides target range and range-rate information using an adaptive cruise control system.

The passive ranging method and system of the present invention are designed to provide safe and reliable target range and range-rate data for an adaptive cruise control system. Certain assumptions are necessary for the initial implementation of the present invention. These assumptions are:

(1) that straight lanes are on the road;
(2) the road is a flat plane; and
(3) vehicles are observed from only very limited aspects.

The assumption that the road is a flat plane is called the "flat earth assumption" and, for the purposes of the present invention, is required to be valid over the range of interest between 5 and 100 meters. While a road will never be a perfect flat plane in practice, the present invention assumes that the road is locally a flat plane.

To assume that the vehicles are observed only from limited aspects is more particularly refined to the assumption that vehicles are observed, ideally, from the front or back view. Within these assumptions, the method and system of the present invention operates as a passive ranging method and system to overcome limitations of known passive ranging methods and systems.

The method of the present invention detects a vehicle in the image plane and computes the range in the field of view. Various features associated with the vehicle can be used for detection. The preferred embodiment of the present invention begins its passive ranging method by selecting an "extended hot spot" (EHS) typically associated with a moving vehicle. The EHS occurs at the interface of the road and the vehicle due to a combination of hot exhaust gases reflecting off the ground and infrared emissions from the wheels. In front views of the vehicle, the wheels stand out prominently. In back views, the EHS extends as a more or less uniform band from one wheel to the other.

The width of the EHS is close to the width of the automobile itself. While automobile geometrics, and the locations and shapes of other features such as hood, windshield, roof, etc., can vary widely from vehicle to vehicle, vehicle widths tend to have much less variation. Using known passive infrared sensors, the EHS generally can be one or more pixels wide. The present invention identifies the endpoints of the EHS that are closest to the automobile-road interface. The endpoints are called "feature points."

Identification of feature points that establish the size of the sensed EHS is done using a version of the "plane sweep" method from computational geometry. The plane sweep method for feature point and, thus, EHS detection relies on a significant contrast between the EHS and the surrounding image of the field that the infrared sensor detects. If a significant contrast exists, a passive infrared sensor can determine feature points nearest the ground. The feature points can then be converted to EHS measurements.

Figure 2:
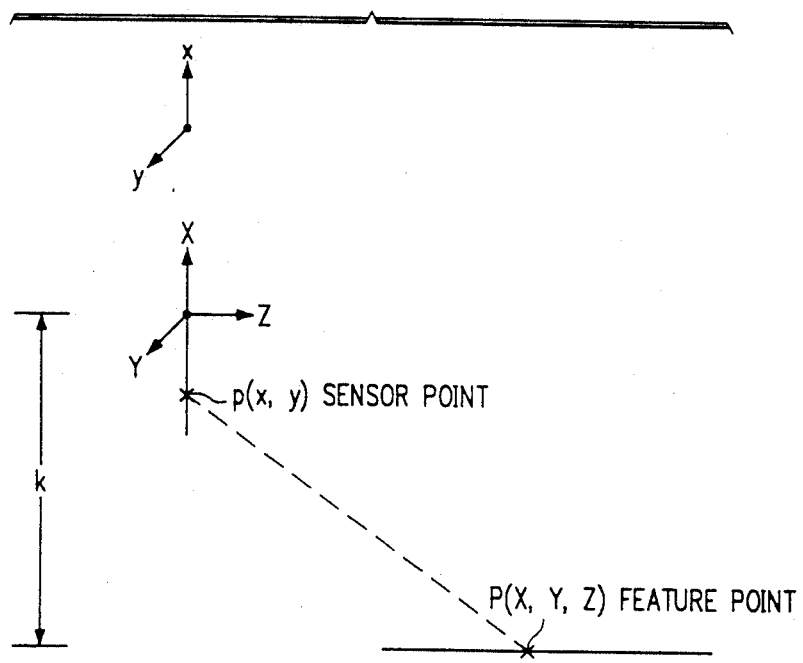
FIG. 2 is a three-dimensional perspective drawing illustrating the concept of perspective projection and adaptive cruise control constraints in identifying a feature point in the Cartesian coordinate system centered at the passive range sensing device.

FIG. 2 shows the projection of point $P(X,Y,Z)$ in the three dimensional Cartesian coordinate system to a point $p(x,y)$ in the image plane. This diagram illustrates the translation of the image point $p(x,y)$ sensed by a passive infrared sensor positioned on a sensing automobile, such as automobile 11 of FIG. 1, into a measurement of an EHS of an automobile such as automobile 13 of FIG. 1. Suppose the sensor of FIG. 2 has a focal length of f. This affords the use of fundamental formulas for perspective projection, relating points in three-dimensional spaces (e.g. feature points) to points in the two-dimensional image plane. According to the fundamental formulae of perspective projection, $$x = \frac{fX}{Z} \quad (1)$$

and $$y = \frac{fY}{Z} \quad (2)$$

According to the flat earth assumption, the value of X is fixed at some constant k. If the coordinate system is centered at the sensing device on an automobile, this constant will be the height of the sensing device from the flat earth. So equation (1) becomes:

$$x = \frac{fk}{Z} \rightarrow Z = \frac{fk}{x} \quad (3)$$

Thus, the value of Z can be computed. Substituting this value in (2), Y can be obtained. Thus, for a given point $(x,y)$ in the image plane, the corresponding coordinates $(Y,Z)$ can be calculated provided X is constant and known. Then, the range to the point from the sensing device on the adaptive cruise control is $\sqrt{(Y^2+Z^2)}$. It is possible to compute distance for the two feature points that characterize the EHS through the plane sweep method. This generates a value for the average distance to the vehicle. For the adaptive cruise control function, the smaller of the two values can be used as the closest distance to the vehicle that the adaptive cruise control system senses. With knowledge of the range to the vehicle for every frame, the range-rate can be calculated by simply differencing the range values over consecutive frames.

Figure 3:
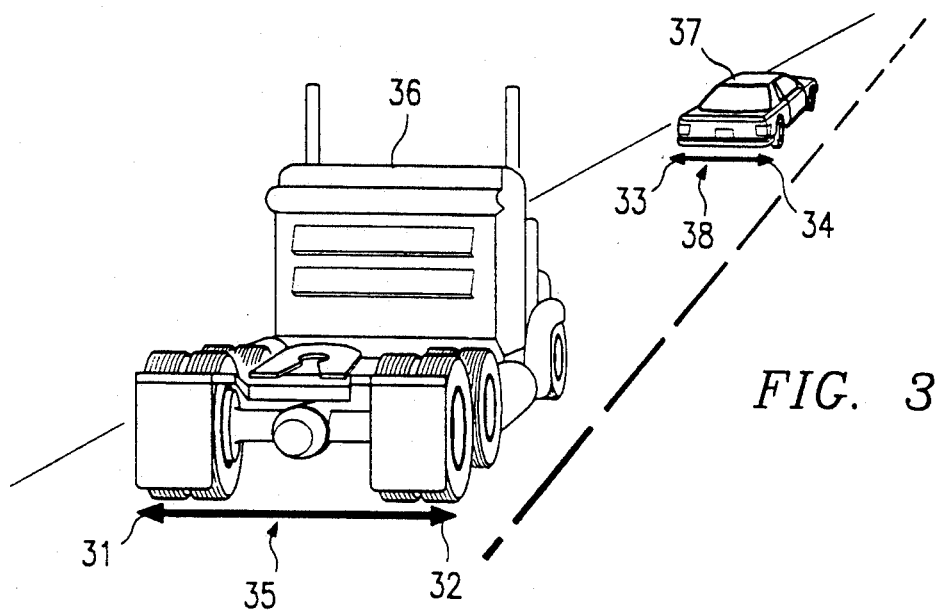
FIG. 3 illustrates an example of the use of feature point detection to generate results for determining range between the passive ranging sensor and a vehicle.

FIG. 3 illustrates feature point detection results obtainable with the system of the present invention. According to FIG. 3, tractor trailer 36 possesses EHS 35, which is bounded by left feature point 31 and right feature point 32. Automobile 37 has EHS 38 bounded by left feature point 33 and right feature point 34.

The preferred embodiment of the present invention incorporates a passive infrared sensor, however, other passive sensors may be used with the plane sweep methodology described in connection with FIG. 2. In the present configuration of the preferred embodiment, data was collected using a cooled passive infrared sensor. Uncooled sensor data was also available, but was not used because of its inferior quality as compared to the cooled sensor data. It is anticipated, however, that an adaptive cruise control system may use the present invention with uncooled sensors.

Not only has the system and method of the present invention proven successful in the type of scenario that FIG. 3 depicts, but can be used also in the following scenarios which have been tested:

(1) single car directly ahead;
(2) truck and a pickup in the adjacent left lane;
(3) car stopped on a shoulder (different from the car in (1);
(4) motor cycle in the adjacent left lane; and
(5) false targets inserted in sequences (1) and (3), during which the system picked only the correct targets.

With the system of the present invention, the accuracy of range and range-rate calculations decreases as range increases.

In the simplest configuration of the present invention, the plane sweep technique computes the range on a frame-by-frame basis, without integrating information across frames. However, as a function of noise or other external variations, the sensor may miss feature points or detect spurious points in a frame. To avoid reporting grossly incorrect range estimates in such situations, an alternative embodiment of the present invention includes within the system a simple Euler predictor that predicts the feature point location in the current frame based on its location in the past two frames. If a difference between the detected and predicted locations of the frame is beyond a predetermined threshold, the detected feature point is replaced by the predicted point location, and this is used for range estimation. Implementation of this predictor algorithm generates satisfactory results in cases where the correct feature points were missed and spurious points were detected in the plane sweep technique.

Figure 4:
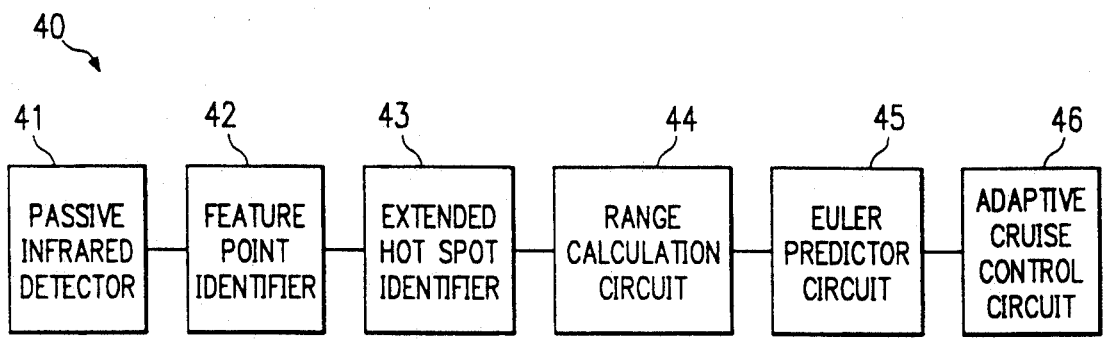
FIG. 4 is a block diagram of a system for performing a preferred embodiment of the method of the present invention.

FIG. 4 illustrates a block diagram for a circuit 40 to carry out the method of the present invention. In the embodiment of FIG. 4, passive infrared detector 41, which may be positioned on an automobile, for example, receives infrared signals from a moving automobile. Feature point identifier 42 scans signals from passive infrared detector 41 to identify feature points closest to the ground. Extended hot spot identifier 43 identifies automobile extended hot spot (EHS) based on feature point input from feature point identifier 42. After the extended hot spot identifier identifies the EHS, range calculation circuitry 44 calculates both range and range rate of the identified automobile. FIGS. 2 and 3 and accompanying text describe the steps that the feature point identifier, extended hot spot identifier, and range calculation circuit employ. To protect against erroneous results from range calculation circuit 44, Euler predictor circuit 45 compares predicted range and range rate values to calculated values and provides one of these values to adaptive cruise control circuit 46. FIGS. 5 through 10 discuss the use of the Euler predictor in the present invention.

Figure 5:
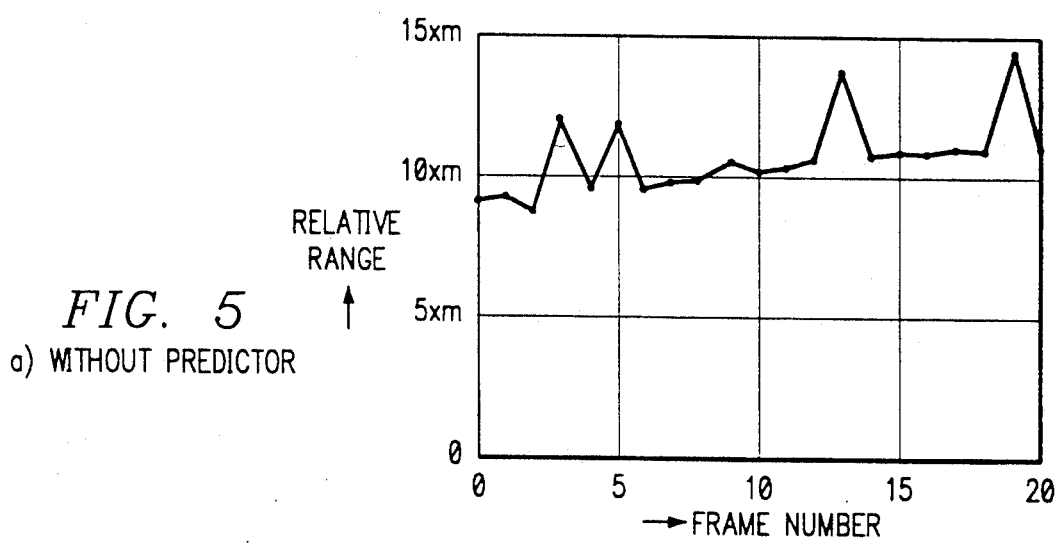
FIG. 5 shows an example of an incorrect feature point detection by the plane sweep method of the present invention.

FIG. 5 comprises a chart of the relative range of a vehicle versus frame number without the Euler predictor to integrate information across frames. Along the vertical axis is relative range from the sensing device to a target vehicle ranging from 0 to 15 meters, the horizontal axis shows frame numbers ranging from 0 to 20 frames. As FIG. 4 indicates, sharp differences exist between frames.

Figure 6:
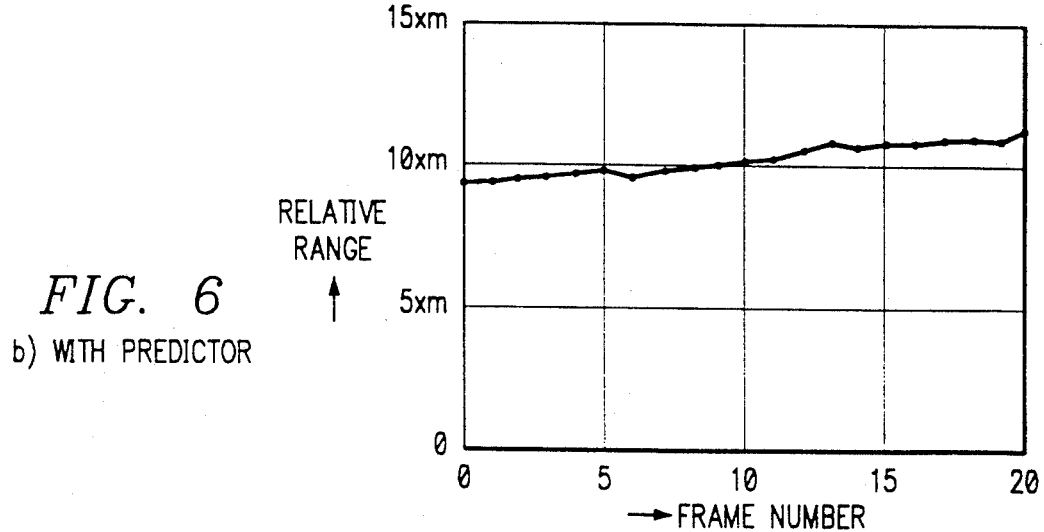
FIG. 6 shows the image of FIG. 4 with correction provided by an Euler predictor.

FIG. 6 shows a similar chart of relative range versus frame number having the same vertical coordinate range of 0 to 15 meters and frame number range of 0 to 20 frames as in FIG. 5. FIG. 6, however, shows the use of the simple Euler predictor to integrate information across frames.

Figure 7:
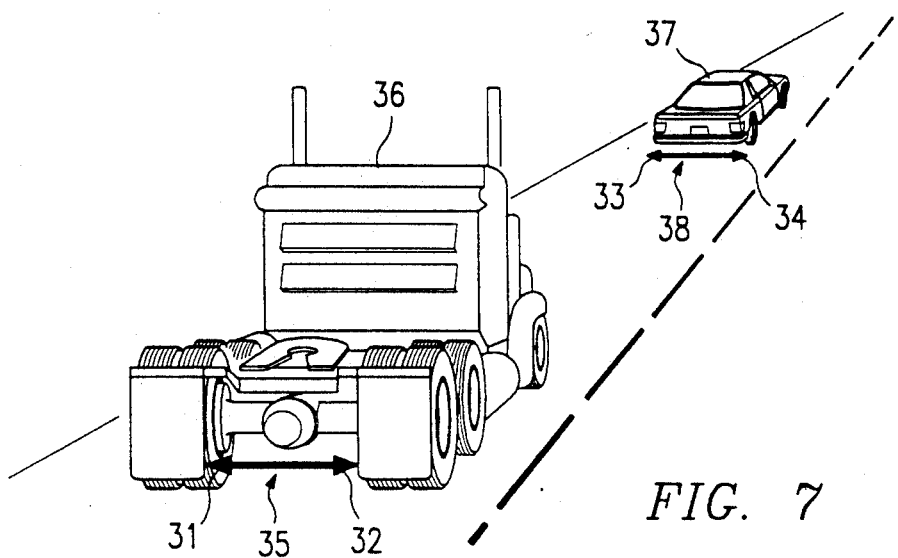
FIGS. 7 and 8 show examples of range computation estimated without and with the Euler predictor.

To illustrate the effect of the Euler predictor on actual results, FIG. 7 shows an example of an incorrect feature point detection by the plane sweep algorithm. As FIG. 7 indicates, the tractor trailer 36 EHS 60 having feature points 61 and 62 is considerably above the interface of the vehicle with the road. This results in erroneous distance information and is a function of missing or spurious range data. Consequently, tractor trailer 36 will be measured as being a greater distance from the sensor than is accurate.

Figure 8:
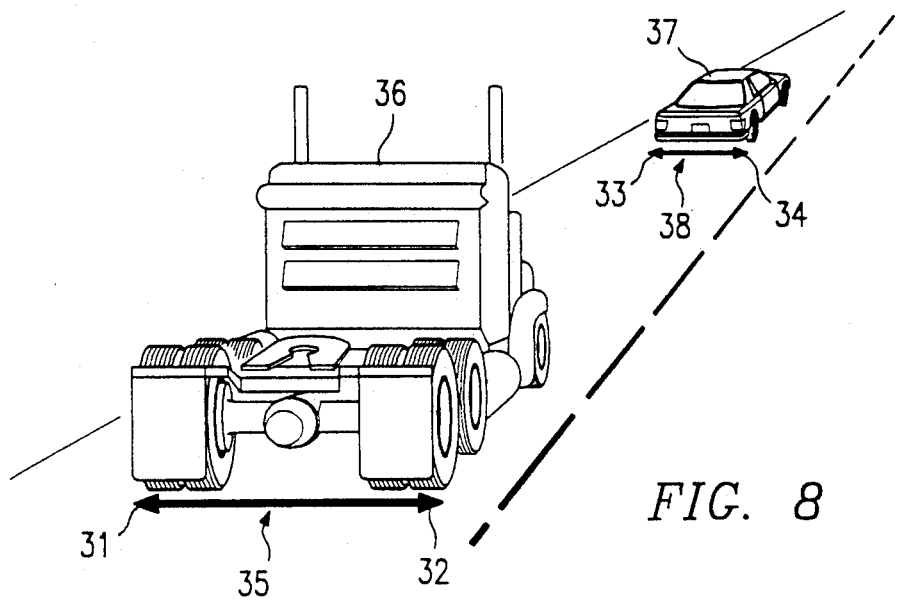

FIG. 8 shows the results of using the Euler predictor to integrate data across frames. With the Euler predictor's integration from frame to frame, the more accurate reading of EHS 35 with feature points 31 and 32 on tractor trailer 36 appear. The EHS 35 of FIG. 8 is much closer to the road-tractor trailer wheel interface. Consequently, this gives more accurate range data information. It should be noted that because of the actually greater distance of vehicle 37, inaccuracies in EHS measurements have a slighter affect.

Figure 9:
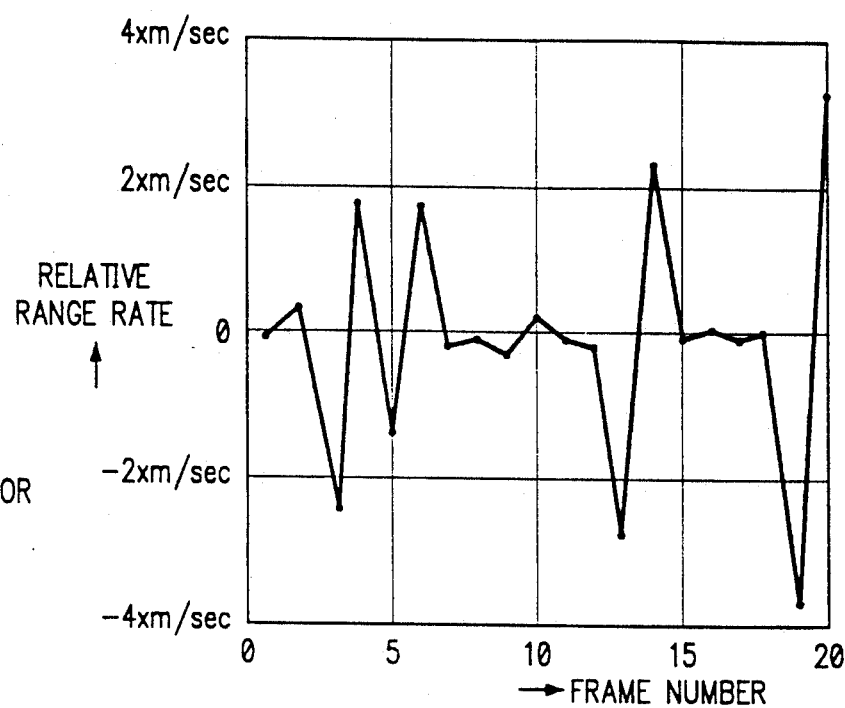
FIGS. 9 and 10 show examples of range-rate computation estimates without and with the Euler predictor.
Figure 10:
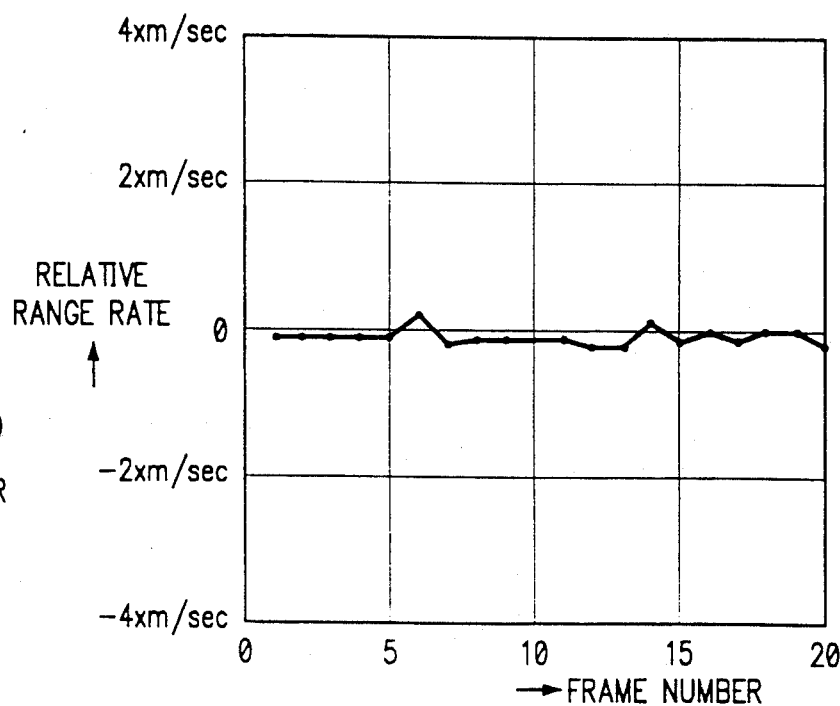

FIGS. 9 and 10 show additional benefits of incorporating the Euler predictor in the plane sweep method of the present invention. FIGS. 9 and 10 plot relative range rate from −4 meters/second to +4 meters/second over measurement frame numbers from 0 to 20. FIG. 9 shows that without the Euler predictor, widely divergent relative range rates occur. These range from approximately −3 meters/second to over +3 meters/second between frames 18 and 20. Another widely divergent range-rate difference exists between frames 19 and 20. In FIG. 10, however, with the use of the Euler predictor, the relative range-rate measurements are more consistent from frame to frame. Although the present invention uses an Euler predictor to integrate information across frames, the present invention contemplates the use of more sophisticated predictors such as Kalman filters and other estimation and predicting methods.

A particular advantage of the present invention is that it can satisfy most cost limitations of automobile manufacturers. Processing times for the plane sweep and optical flow methods using μrad detectors are well within the capabilities of 100K gate arrays. A 100K gate array is an economical device for processing the infrared signals from the passive detector and can be implemented in a consumer or passenger automobile.

Although the invention has been described with reference to the above specific embodiments, this description is not meant to be construed in a limiting sense. Various modifications of the disclosed embodiment, as well as alternative embodiments of the invention will become apparent to persons skilled in the art upon reference to the above description. It is further contemplated that the appended claims will cover such modifications that fall within the true scope of the invention.

What is claimed is:

1. A method for measuring distance between a first moving object and a second moving object, said second moving object emits infrared energy, comprising the steps of:

operating an infrared energy-sensing device to detect an image of the infrared energy emitted by said second object;

determining a region in said image, said region having a size characteristic of said second object and said region corresponding to a region on said second object emitting infrared energy characteristic of the object;

characterizing said region by a plurality of feature points;

sensing said feature points in said image; and ascertaining the distance between the sensing device and the moving object as a function of said feature points using perspective projection geometry.

2. The method of claim 1, wherein said energy sensing device is a passive infrared imaging sensor.

3. The method of claim 1, wherein said moving energy-emitting object is an automotive vehicle.

4. The method of claim 1, wherein said region determining step comprises identifying an extended hot spot on said object, said extended hot spot occurring proximate to the point that the moving object exhausts combustion gases.

5. The method of claim 1, wherein said moving object is an automotive vehicle and said region determining step comprises the step of determining an extended hot spot on said automotive vehicle, said extended hot spot occurring at the interface of the road and the automotive vehicle.

6. The method of claim 5, wherein said region characterizing step comprises the step of identifying a plurality of feature points on said extended hot spot, said feature points being relatively uniform across all classes of automotive vehicles.

7. The method of claim 1, wherein said distance ascertaining step includes the step of ascertaining the distance between the moving object and the sensing device as a function of said feature points using perspective projection formulae.

8. The method of claim 1, further comprising the step of integrating a plurality of sense range measurements.

9. The method of claim 8, wherein said integrating step is performed by an Euler predictor.

10. The method of claim 8, wherein said integrating step comprises the use of a Kalman filter for filtering said feature point measurements.

11. The method of claim 1, wherein said sensing device measures said feature points with a subtended solid angle of measurement of not more than 0.1 milliradians.

12. A device for measuring distance between a first moving object and second moving object, said second moving object is an infrared energy emitting object, comprising:
an infrared energy sensing device operable to obtain images of the infrared energy emitted from said second object;
circuitry for determining a region in said image, said region having a size characteristic of said second object and corresponding to a region of said second object emitting infrared energy characteristic of the object;
circuitry for characterizing said region by a plurality of feature points;
circuitry for sensing said feature points within said images; and
circuitry for ascertaining the distance between said first object and said second object as a function of said feature points.

13. The apparatus of claim 12, wherein said energy sensing device is a passive infrared imaging sensor.

14. The apparatus of claim 12, wherein said second object is an automotive vehicle.

15. The apparatus of claim 12, comprising circuitry for identifying an extended hot spot on said object, said extended hot spot occurring at the point that the moving object exhausts combustion gases.

16. The apparatus of claim 12, wherein said second object is an automotive vehicle and said circuitry for determining a region includes circuitry for determining an extended hot spot on said vehicle, said extended hot spot occurring at the interface of the road and the automotive vehicle.

17. The apparatus of claim 16, wherein said region characterizing step comprises circuitry for identifying a plurality of feature points on said extended hot spot, said feature points being relatively uniform across all classes of automotive vehicles.

18. The apparatus of claim 12, wherein said circuitry for ascertaining the distance includes circuitry for ascertaining the distance between said first object and said second object as a function of said feature points using perspective projection formulae.

19. The apparatus of claim 12, further comprising circuitry for integrating a plurality of range measurements.

20. The apparatus of claim 19, wherein said integrating step is performed by an Euler predictor.

21. The apparatus of claim 19, wherein said integrating step comprises the use of a Kalman filter for filtering said feature point measurements.

22. The apparatus of claim 12, wherein said sensing device measures said feature points with a subtended solid angle of measurement of not more than 0.1 milliradians.

23. A vehicle speed control system for adaptively responding to distances between a first moving object and a second moving object, wherein said second moving object is an infrared energy emitting object, comprising:
an infrared energy sensing device for obtaining images of the infrared energy emitted from said second moving object;
an adaptive cruise control device;
a range detecting device associated with said adaptive cruise control device, said range detecting device including:
circuitry connected to said energy sensing device for determining a region in said images, said region having a size characteristic of the object and corresponding to a region of said second object emitting infrared energy characteristic of the object;
circuitry for characterizing said region by a plurality of feature points;
circuitry for sensing said feature points;
circuitry for ascertaining the distance between the sensing device and the moving object as a function of said feature points; and
circuitry for transmitting a signal representative of said distance from said range detecting device to said adaptive cruise control device.

24. The system of claim 23, wherein said energy sensing device is a passive infrared imaging sensor.

25. The system of claim 23, wherein said moving energy emitting object is an automotive vehicle.

26. The system of claim 23, wherein said vehicle speed control apparatus is an adaptive cruise control device.

27. The system of claim 23, wherein said region determining step comprises circuitry for identifying an extended hot spot on said object, said extended hot spot occurring at the point that the moving object exhausts combustion gases.

28. The system of claim 23, wherein said moving object is an automotive vehicle and said region determining step comprises circuitry for determining an extended hot spot on said vehicle, said extended hot spot occurring at the interface of the road and the automotive vehicle.

29. The system of claim 28, wherein said region characterizing step comprises circuitry for identifying a plurality of feature points on said extended hot spot, said feature points being relatively uniform across all classes of automotive vehicles.

30. The system of claim 23, wherein said distance ascertaining step includes circuitry for ascertaining the distance between the moving object and the sensing device as a function of said feature points using perspective projection formulae.

31. The system of claim 23, further comprising circuitry for integrating a plurality of range measurements.

32. The system of claim 31, wherein said integrating step is performed by an Euler predictor.

33. The system of claim 31, wherein said integrating step comprises the use of a Kalman filter for filtering said feature point measurements.

34. The system of claim 23, wherein said sensing device measures said feature points with a subtended solid angle of measurement of not more than 0.1 milliradians.

* * * * *